Patented Oct. 22, 1940

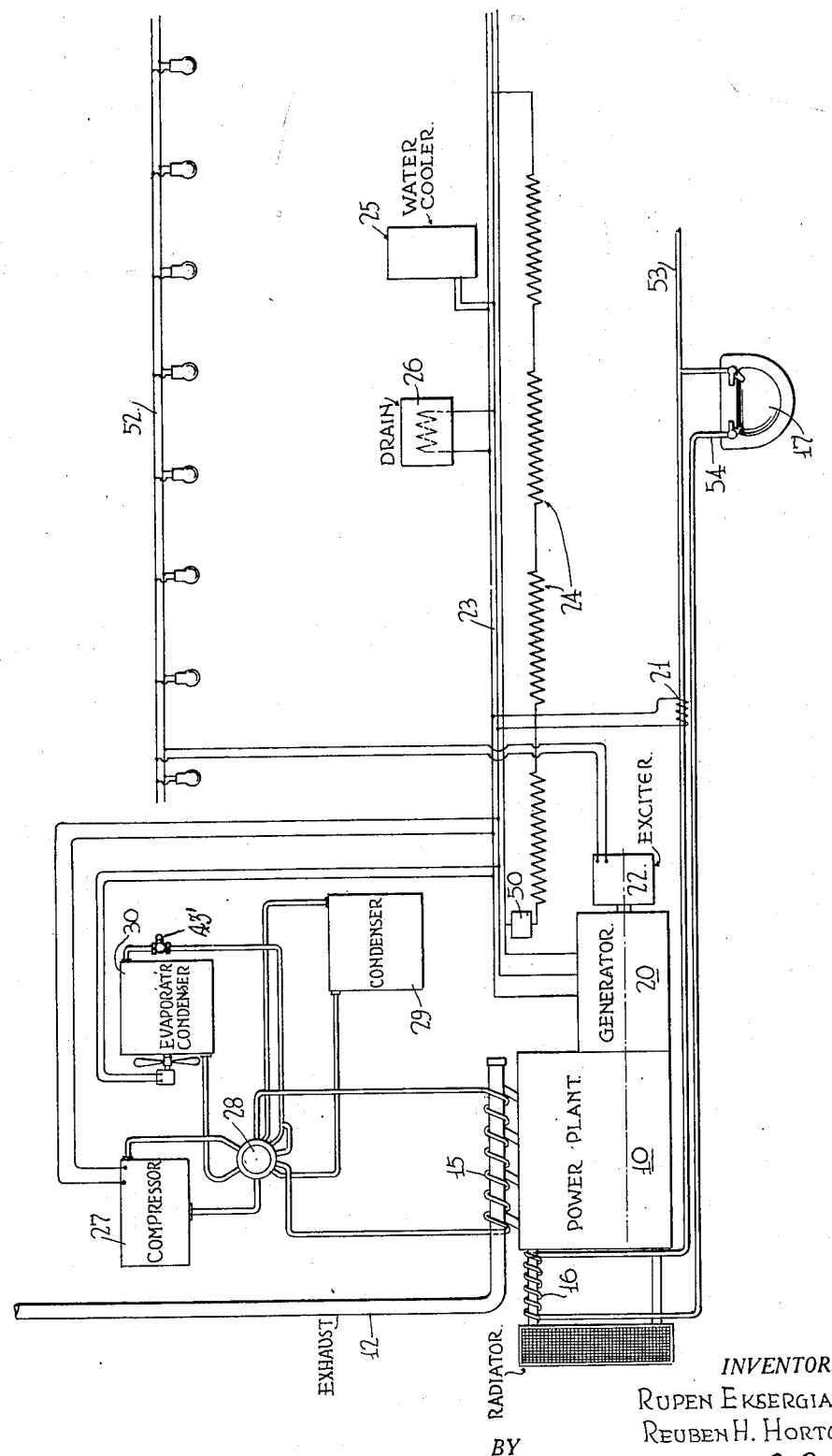

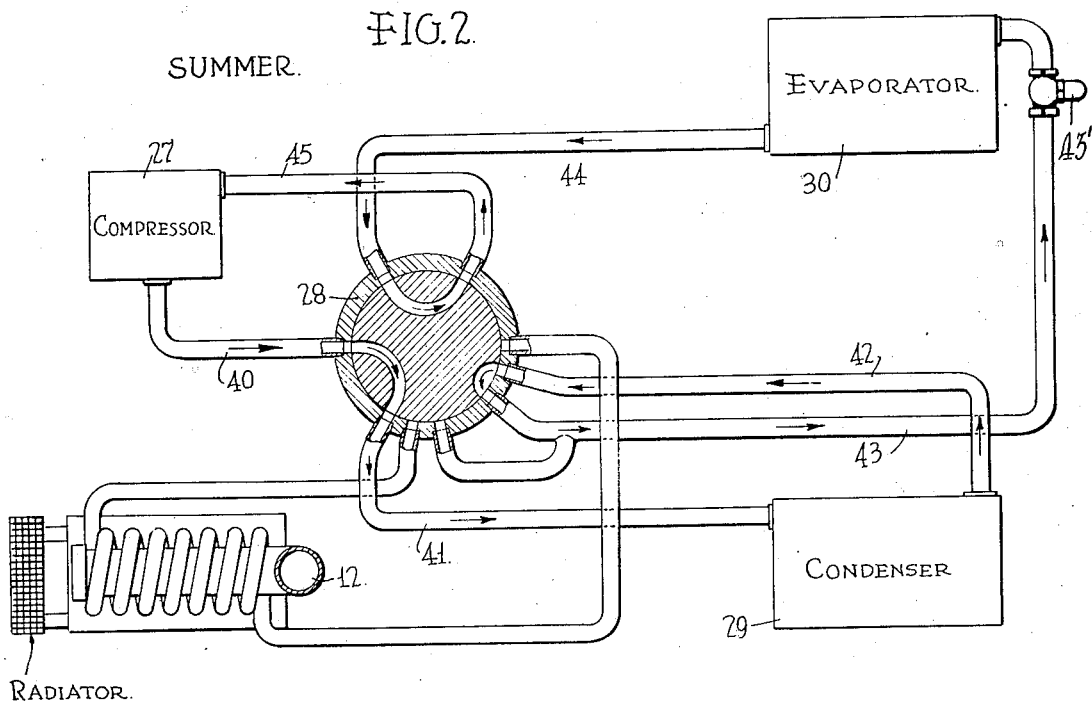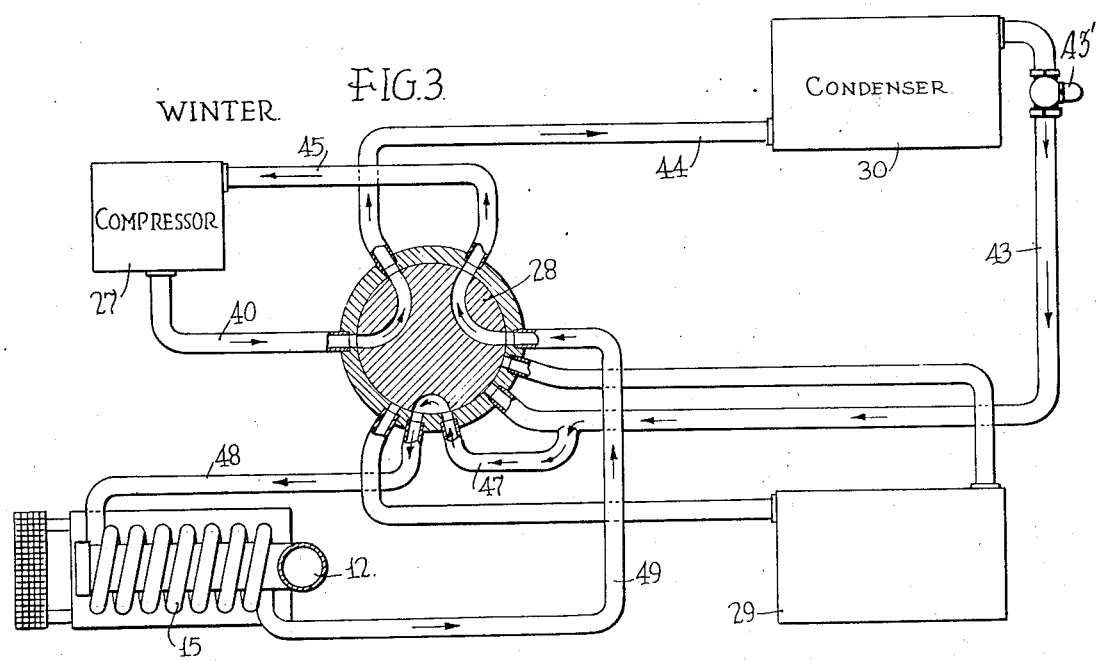

2,218,793

UNITED STATES PATENT OFFICE 2,218,793

HEATING AND COOLING SYSTEM

Reuben Harland Horton, Philadelphia, and Rupen Eksergian, Lansdowne, Pa., assignors to Edward G. Budd Manufacturing Company, Philadelphia, Pa., a corporation of Pennsylvania Application April 15, 1937, Serial No. 137,006

1 Claim. (Cl. 257—9)

This invention relates to improvements in a combined heating and cooling system and more particularly to the use of such a system for year round air conditioning of a vehicle.

The use of the reversible Carnot cycle has heretofore been suggested but inasmuch as the operation of an apparatus employing such a cycle is definitely limited to ambient temperatures usually in excess of 20° F., it has not proved entirely successful for rail car operation.

The principal object of this invention is to provide an improved heating and cooling system which is adapted for operation in connection with auxiliary power equipment regardless of the atmospheric temperature.

Another object of the invention is to materially reduce the auxiliary power requirements of a vehicle by employing the waste heat of the power source as the energy supply for a reverse refrigeration cycle.

A still further object of the invention is to provide a balance between the power demand on auxiliary power equipment for a vehicle and the heating or cooling demand so that a fluctuation in one will tend to cause a correction in the output of the other.

Further objects and advantages of the invention will appear from the following disclosure of a preferred form of embodiment thereof taken in connection with the attached drawings in which:

Fig. 1 is a diagrammatic layout of an auxiliary power and heating and cooling system applied to a vehicle;

Fig. 2 is a detail diagrammatic view of the reversible cycle valve arranged for a hot weather or summer condition, and Fig. 3 is a view similar to Fig. 2 showing the valve arranged for a winter or cold weather condition.

The particular form of embodiment of the invention hereinafter described is especially adapted to a vehicle such as a rail car but it is to be understood that the invention may be used in connection with any structure having an auxiliary power and heating and cooling requirements. The power source 10 is represented as an internal combustion engine such as of the Diesel type and in such a power source the waste heat is approximately one-third of the available heat. This heat which appears particularly in the exhaust pipe 12 and in the water cooling is taken advantage of by suitable heat exchange coils 15 surrounding the exhaust pipe and by suitable heat exchange coils 16 surrounding the water cooling connection to the radiator.

The power plant 10 is normally provided with a generator 20 and an exciter 22, such generator supplying the main line current in the line 23, the lights 52 being supplied from the exciter 22. The main line current is available for electrically operating heaters 24, a water cooler 25, drain protection 26, supplementary hot water heater 21 and any other electrical power load requirement including fans and principally the compressor 27.

The compressor 27 is the prime mover for the reversible refrigeration cycle which in the summer time provides the necessary refrigeration for the evaporator 30. In the winter time by a reversal of the valve 28, the evaporator 30 is supplied with heated medium as hereinafter described and in fact becomes a condenser as generally indicated in Fig. 3.

The particular valve circuit for summer conditions is shown in Fig. 2 in which the compressor 27 discharges through conduit 40 through the valve 28, the conduit 41, into condenser 29, from which the sensible heat is removed from the refrigerating medium. The cooled refrigerant then discharges through the conduit 42, through the valve 28 and conduit 43 and throttling valve 43' into the evaporator 30 in which it expands for the necessary refrigeration. The expanded gas then discharges through the conduit 44 through the valve 28 and through conduit 45 back to the compressor.

Under winter conditions, the exhaust heat of the power plant is used, the exhaust coil 15 becoming the evaporator as shown in Fig. 3 and in this case, the compressor 27, similarly connected to the valve by the conduit 40, is connected to the condenser 30 which, under summer conditions, was the evaporator. The flow is reversed in conduits 44 and 43 and the heating medium passes through the by-pass conduit 47, through valve 28, and out through conduit 48, through the coil 15, through the conduit 49, back through the valve, and through the conduit 45 to the compressor. As the temperature of the condenser is high in this case, it serves as the heating medium for the circulating air.

Under winter conditions, it will be found that a demand for heat is first met electrically by the heaters 24 through the operation of the thermostat control 50. Such a demand increases the load on the power plant 10 and this immediately causes a greater heat loss as the heat loss is proportional to the load. With the increasing heat available in the evaporator coil 16, greater heat transfer is obtained through the condenser 30 and, with an increasing supply of heat from the reverse refrigeration cycle, the demand on the heaters 24 will drop. The balance can be maintained for the desired heating of the compartment.

The demand for auxiliary power for a vehicle body of the rail car type is such that a power plant of about 50 H. P. is necessary. This is to provide approximately 22.5 kw. for the floor heaters 24, approximately 8 kw. for operation of the compressor 27 and the necessary air conditioning fans, approximately 14 kw. for the supply of hot water, approximately 5 kw. for drain protection, approximately 0.5 kw. for the water cooler. In addition, there is a demand of approximately 4.5 kw. for the lights 52 which are normally operated with the coil from the exciter 52. With such a load, there is available, assuming a heat demand of between 175,000 and 200,000 B. t. u., a source of exhaust heat from the power plant, if of the Diesel type of about 100,000 B. t u. It is possible to reduce the size of the auxiliary power plant 10 by one-third if the exhaust or waste heat is used in a reverse refrigeration cycle.

The hot water requirements on many forms of vehicles are especially great and on deluxe rail car equipment, the lavatories 17, showers, etc., it is desirable to use all available heat sources. The cold water supply pipe 53 is thus fed into heat exchange coil 16 on the power plant water cooling system with the hot water pipe indicated at 54. The supplementary electric heater 21 is usually necessary, however, on heavy demands.

The location of the power plant 10 and auxiliary equipment is preferably entirely below the floor and, for this purpose, a horizontal cylinder power plant may be preferable and it is preferable to provide an independent auxiliary power plant for each car under most circumstances. It is to be understood, however, that the power plant 10 may be of a capacity to be the main propulsion plant of a vehicle and, when used in connection with a rail car, it may be adapted to propel one or more cars.

While we have shown a preferred form of embodiment of our invention, we are aware that modifications may be made thereto and we, therefore, desire a broad interpretation of our invention within the scope and spirit of the disclosure herein and of the claims appended hereinafter.

What we claim is:

A self-contained air-conditioning system having compression refrigerating equipment including a compressor, a condenser, and an evaporator in series in a refrigerant circulating circuit, primary power means to operate said compressor to cool the space in which the evaporator is located, means to operate at least a portion of the said refrigerating circuit to heat the evaporator and hence heat the space in which it is located, said means comprising a valve system connected to effect both obverse and reverse flow of the refrigerant through portions of the circuit under the action of the compressor, and including means to dissociate the condenser in said circuit in the obverse connection of the valve system, and a heat exchange device associated with said primary power means to derive waste heat therefrom, said valve system including also a connection with the said heat exchanging device adapted to pass the refrigerant therethrough during the obverse connection of the aforesaid elements of the refrigerating system.

REUBEN HARLAND HORTON.
RUPEN EKSERGIAN.